US006863615B2

(12) United States Patent
Herchenbach et al.

(10) Patent No.: US 6,863,615 B2
(45) Date of Patent: Mar. 8, 2005

(54) CENTERED DOUBLE UNIVERSAL JOINT

(75) Inventors: Paul Herchenbach, Ruppichteroth (DE); Martin Hector, Siegburg (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/199,642

(22) Filed: Jul. 19, 2002

(65) Prior Publication Data

US 2003/0017876 A1 Jan. 23, 2003

(30) Foreign Application Priority Data

Jul. 20, 2001 (DE) .......................................... 101 35 347

(51) Int. Cl.[7] .............................................. F16D 3/26
(52) U.S. Cl. ........................ 464/118; 464/14; 464/905
(58) Field of Search .............................. 464/11, 12, 13, 464/14, 118, 117, 128, 129, 405

(56) References Cited

U.S. PATENT DOCUMENTS

| | | | | |
|---|---|---|---|---|
| 4,207,757 A | * | 6/1980 | Onuma ........................ | 464/11 |
| 4,257,243 A | | 3/1981 | Herchenbach | |
| 4,490,125 A | * | 12/1984 | Konrad et al. ................ | 464/11 |
| 4,781,662 A | * | 11/1988 | Mayhew et al. .............. | 464/14 |
| 4,997,407 A | | 3/1991 | Kretschmer et al. | |
| 5,419,740 A | * | 5/1995 | Koyari et al. ................ | 464/118 |
| 6,616,536 B2 | * | 9/2003 | Herchenbach et al. ...... | 464/118 |

FOREIGN PATENT DOCUMENTS

| | | |
|---|---|---|
| DE | 28 02 572 C2 | 7/1982 |
| DE | 39 21 242 C1 | 6/1990 |

* cited by examiner

Primary Examiner—Kenn Thompson
(74) Attorney, Agent, or Firm—Harness, Dickey & Pierce, P.L.C.

(57) ABSTRACT

A centered double universal joint has a first outer joint yoke (1) with first centering means (4, 6), a first inner joint yoke (8), a first cross member (10) connecting the first outer joint yoke (1) via rolling bearings (11) to the first inner joint yoke (8), and a first lubricant channel (44) for lubricating the rolling bearing (11). Also, the joint has a second outer joint yoke (12) with second centering mechanism (15, 17), a second inner joint yoke (19), and a second cross member (21) connecting the second outer joint yoke via rolling bearings (22) to the second inner joint yoke (19). A guiding disc (25) has a first central centering projection (28) articulatably connected to the first centering means (4,6). The guiding disc has a second central centering projection (29) articulatably connected to the second centering means (15, 17). Guiding faces (32, 33) on the guiding disc (25) are radially adjustably guided in an annular recess (24) of a housing (9, 20). The first lubricating channel (44) is connected to a first lubricant guiding mechanism (50) of the first centering mechanism (4, 6). The guiding disc (25) has a lubricant channel (51, 53) which is connected to the first lubricant guiding mechanism (50) and ends in at least one of the guiding faces (32, 33).

5 Claims, 1 Drawing Sheet

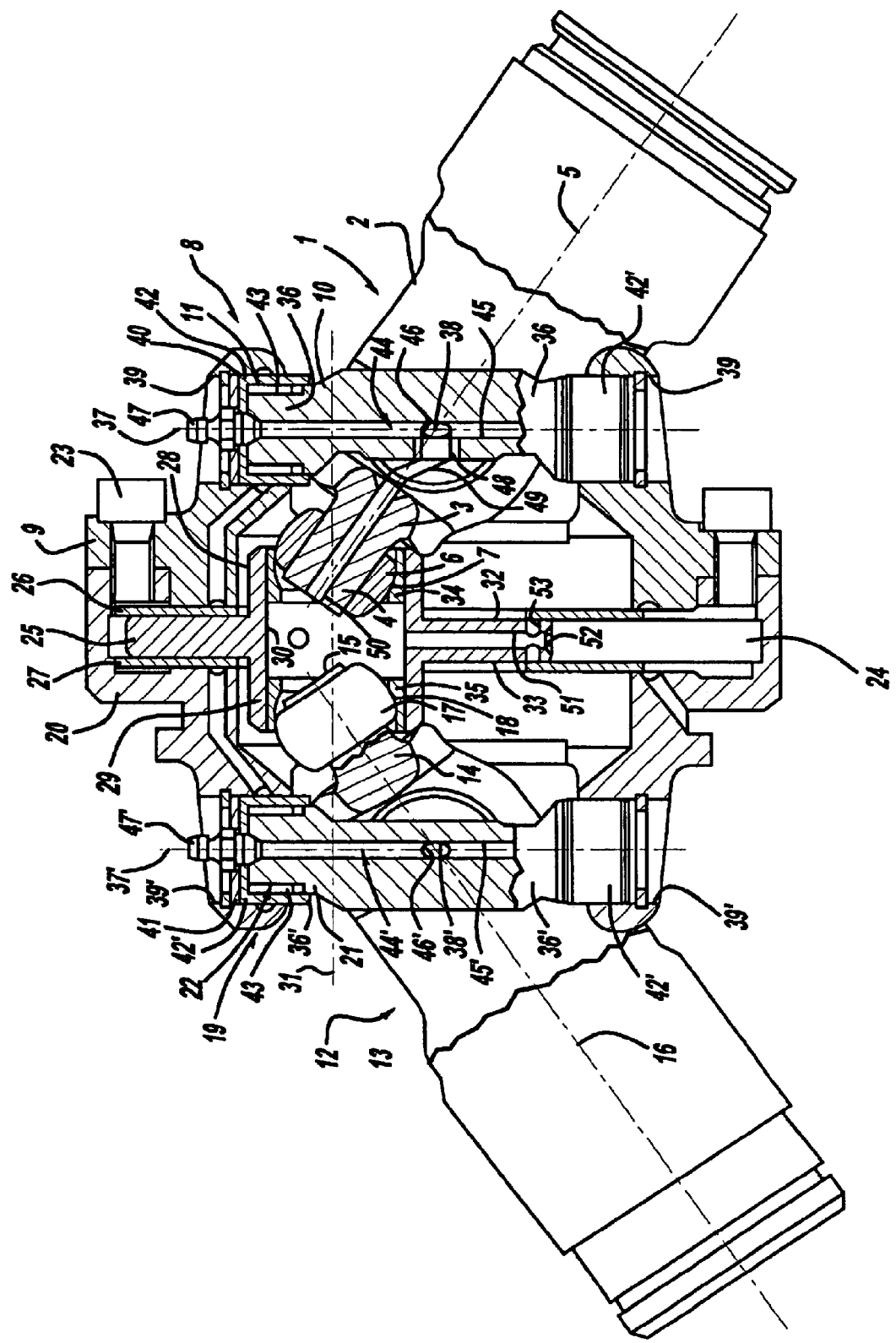

CENTERED DOUBLE UNIVERSAL JOINT

CROSS-REFERENCE TO RELATED APPLICATIONS

This application claims priority to German Patent Application No. 10135347.2 filed Jul. 20, 2001, which application is hereby expressly incorporated by reference.

FIELD OF THE INVENTION

The invention relates to a centered double universal joint, especially for driving, or for drives in, agricultural implements and tractors.

BACKGROUND OF THE INVENTION

DE 39 21 242 C1 (which is the priority document for U.S. Pat. No. 4,997,407) describes a centered double universal joint with two outer joint yokes articulatably connected by a cross member to two inner joint yokes to form part of a housing. An annular recess is formed in the housing. A guiding disc is radially adjustably supported in the housing. Floating annular guiding plates sandwich the guiding disk. The guiding disc includes a centrally arranged guiding projection. The projection projects from both sides of the guiding disc. The outer joint yokes, whose yoke arms are connected to one another by a bridge, each include a journal projection. The journal projection includes a spherical face and is pivotably supported in a bore of the central guiding projection of the guiding disc. The cross members each include lubricating channels which are used to lubricate rolling contact bearings. The rolling contact bearings support the cross member in the yoke arms. The lubricating channels are each connected to lubricant guiding means in the journal projections. The channels open into the bore of the central guiding projection of the guiding disc. At least one radially extending lubricant channel is provided in the guiding disc. The channel connects the bore in the central guiding projection to the annular recess. It is thus possible to convey lubricant from a lubricating nipple, provided at the cross member, into the annular recess. The disadvantage, however, is that at high rotational speeds of the double universal joint, the lubricant is thrown radially outwardly as a result of the centrifugal forces. This has an adverse effect on the lubrication of the guiding disc and the guiding plates.

DE 28 02 572 C2 (which is the priority document for U.S. Pat. No. 4,257,243) discloses a centered double universal joint wherein a guiding disc, articulatably connected via centering projections to outer joint yokes, is radially adjustably guided in an annular recess. The housing includes a lubricating nipple which is directly connected to the annular recess by a lubricant channel. Thus, the rolling contact bearings of the cross members and the annular recesses are lubricated independently of one another. Accordingly, the lubricant is pressed radially outwardly by the centrifugal forces.

SUMMARY OF THE INVENTION

It is an object of the present invention to provide a centered double universal joint with a guiding disc that improves the lubrication of the guiding disc.

In accordance with the invention, a centered double universal joint includes a first outer joint yoke with first outer yoke arms. A first bridge connects the first outer yoke arms to one another. A first centering mechanism is associated with the first bridge. A first inner joint yoke includes first inner yoke arms. A first cross member articulatably connects the first outer yoke arms, via rolling contact bearings, to the first inner yoke arms. The first cross members has first lubricant channel for lubricating the rolling contact bearings. A second outer joint yoke has second outer yoke arms. A second bridge connects the second outer yoke arms to one another. A second centering mechanism is associated with the second bridge. A second inner joint yoke includes second inner yoke arms. A second cross member articulatably connects the second outer yoke arms, via rolling contact bearings, to the second inner yoke arms.

A guiding disc defines a longitudinal axis. The guiding disc has a first central centering projection articulatably connected to the first centering mechanism of the first outer joint yoke. The guiding disc has a second central centering projection articulatably connected to the second centering mechanism of the second outer joint yoke. Guiding faces on the guiding disc radially adjustably guided the guiding disc in an annular recess of a housing. The first inner joint yoke and the second inner joint yoke form part of the housing. The first lubricating channel of the first cross member is connected to first lubricant guiding mechanism of the first centering mechanism. The guiding disc has at least one lubricant channel connected to the first lubricant guiding mechanism of the first centering mechanism. The lubricant channel ends in at least one of the guiding faces.

An advantage of this design is that the lubricant channel of the guiding disc ends directly in a guiding face. Thus, this ensures that the guiding face is directly lubricated.

When the guiding disc is directly supported in the annular recess of the housing, the guiding faces of the guiding disc are in sliding contact with the annular sealing faces which delimit the annular recess. The lubricant passes through the lubricating channel of the guiding disc and enters the region directly between the guiding face of the guiding disc and the sealing face of the annular recess. When annular guiding plates are provided between the guiding faces of the guiding disc and the sealing faces of the radial recess, lubricant is directly introduced between the guiding face of the guiding disc and a sealing face of the guiding plate.

Furthermore, it is possible to provide a common lubricant connection between the cross member and the guiding disc. This is accomplished by the connection of the first lubricant channel of the first cross member and the lubricant channel of the guiding disc, via the first lubricant guiding means of the first centering means. This means that when the first cross member is lubricated, the first centering means and the guiding disc are lubricated at the same time.

To achieve an easy-to-produce embodiment, the guiding disk lubricant channel includes a first bore extending radially relative to the longitudinal axis. The first bore is open to the annular guiding recess. A second bore extends parallel to the longitudinal axis and ends in at least one of the guiding faces.

An easy connection between the first lubricant channel of the first cross member and the first lubricant guiding mechanism of the first centering mechanism can be ensured by the first lubricant channel of the first cross member. The first lubricant channel of the cross member includes a bore opening towards the first bridge. The bore is connected to the first lubricant guiding mechanism of the first centering mechanism by a resilient hose.

Accurate control of the two universal joints and a long service life are achieved by providing the guiding disc with a cylindrical bearing bore. The bearing bore extends through the first centering projection and the second centering projection. The bore extends coaxially relative to the longitudinal axis. The first centering mechanism and the second centering mechanism each include a bearing journal which extends coaxially relative to an axis of rotation of the respective outer joint yoke. A bearing ball is provided in each bearing journal. The bearing ball is in the form of a spherical layer with a spherical outer face. A through-bore in the bearing ball positions the bearing ball on the bearing journal. The bearing ball is held at least axially relative to the axis of rotation. A bearing race pivotably supports the bearing ball on the outer face of the bearing ball. A corresponding hollow-spherical bore in the bearing race receives the bearing ball. The bearing race has a cylindrical outer face for axially adjustably positioning the bearing race in the cylindrical bearing bore of the guiding disc.

According to a preferred embodiment, annular guiding plates are provided on both sides of the guiding disc in the annular recess. The annular recess is closed on the radial outside. The outer diameter of the guiding plates is greater than the inner diameter of the annular recess and smaller than the greatest diameter of the annular recess. The inner diameter of the guiding plate is greater than the outer diameter of the centering projections of the guiding disc and smaller than the outer diameter of the guiding disc. The at least one lubricant channel of the guiding disc opens towards at least one guiding plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE is a side view of an inventive double universal joint, partially in section. The double universal joint includes two individual universal joints which are connected to one another via a centering mechanism. Both joints each accommodate half the angle of articulation when an input shaft is articulated relative to an output shaft in order to ensure constant velocity. The two individual joints are substantially identical in design.

DETAILED DESCRIPTION OF THE PREFERRED EMBODIMENTS

The following description of the preferred embodiment(s) is merely exemplary in nature and is in no way intended to limit the invention, its application, or uses.

The double universal joint includes a first outer joint yoke 1 with two first outer yoke arms 2. The free ends of the yoke arms are connected to one another by a first bridge 3. The first bridge 3 carries a first bearing journal 4 defining a first axis 5. The outer face of the first bearing journal 4 is cylindrical. A first bearing ball 6, in the form of a spherical layer, is immovably held on the first bearing journal 4 along the first axis 5. The spherical outer face of the first bearing ball is identified by reference number 7. The first outer joint yoke 1 is articulatably connected to the first inner joint yoke 8 via a first cross member 10 and a rolling bearing 11. The first inner joint yoke 8, with its two yoke arms, is produced to be integral with a first bearing housing 9.

The second joint includes a second outer joint yoke 12 with two outer yoke arms 13. Again, only one yoke arm is visible. The two second yoke arms 13 are connected to one another by a second bridge 14. The second bridge carries a second bearing journal 15. The second bearing journal has a cylindrical outer face and is centered on the second axis 16. A second bearing ball 17 is immovably and axially held on the second bearing journal 15 along the second axis 16. The bearing ball 17 has a spherical outer face 18. The second outer joint yoke 12 is articulatably connected to the yoke arms 13 of the second inner joint yoke 19 via a second cross member 21 and rolling bearings. The second inner joint yoke 19 is also produced to be integral with a second bearing housing portion 20.

The first bearing housing portion 9 and the second bearing housing portion 20 are removably connected to one another by bolts 23. The two housing portions 9, 20, together, form a radially outwardly closed and radially inwardly open annular recess 24. A guiding disc 25 and guiding plates 26, 27 are radially adjustably accommodated in the recess 24. The first guiding plate 26 and the second guiding plate 27 are arranged on either side of the guiding disc 25. The diameters of the two annular guiding plates 26, 27 of the guiding disc 25 and of the annular recess 24 are adjusted to one another such that the articulation-related adjustment of the guiding disc 25 in the annular recess 24 can be carried out. However, the guiding disc 25 is held securely in the recess. Accordingly, the greatest diameter of the annular recess 24 is greater than the outer diameter of the two annular guiding plates 26, 27 and greater than the outer diameter of the guiding disc 25. However, the inner diameter of the two annular guiding plates 26, 27 is smaller than the outer diameter of the guiding disc 25.

The guiding disc 25 includes a central first centering projection 28 and a second centering projection 29. A cylindrical bearing bore 30 defining a longitudinal axis 31 extends through the projection 28, 29. The first centering projection 28 projects beyond a first guiding face 32 of the guiding disc 25. The second centering projection 29 projects beyond a second guiding face 33 of the guiding disc 25. This is the reason why the smallest diameter of the annular recess 24 is greater than the outer diameter of the guiding projections 28, 29. Furthermore and accordingly, the inner diameter of the annular guiding plates 26, 27 also has to be greater than the outer diameter of the guiding projections 28, 29.

A first bearing race 34 is positioned on the first bearing ball 6. A hollow-spherical bore of the first bearing race 34 is adapted to receive the spherical outer face 7 of the first bearing ball 6. The first bearing race 34 has a cylindrical outside surface which is displaceably guided in the bearing bore 30. Accordingly, the second bearing ball 17, via its spherical outer face 18, is received in a corresponding hollow-spherical bore of a second bearing race 35. The second bearing race 35 is also received in the bearing bore 30 by its cylindrical outer face.

The two cross members 10, 21 each include four trunnions 36. Two trunnions are always arranged on a common trunnion axis 37, 38. The trunnions 36 are supported in bores 39 of the yoke arms 2, 13, 40, 41 by rolling contact bearings 11, 22. The rolling contact bearings 11, 22 each include a bearing bush 42 arranged in the respective bore 39. Also, rolling members 43 roll on the outer face of the respective trunnion 36 and on an inner face of the respective bearing bush 42.

For the purpose of lubricating the rolling contact bearing 11, the first cross member 10 includes a first lubricant channel 44. The first lubricating channel 44 includes a bore 45 which extends along the trunnion axis 37 of two trunnions 36. Furthermore, the first lubricant channel 44 includes a bore 46 which extends along the other trunnion axis 38. The bores 45, 46 start from the end face of a trunnion 36 and end in an end face of the remote trunnion 36.

The bores 45, 46 intersect one another in the center of the cross member 10. One of the trunnions 36 includes a lubricating nipple 47 which is connected to the first lubricant channel 44. Via this route, the first lubricant channel 44 can be supplied with lubricant.

The first cross member 10 includes a further bore 48 which leads to the first lubricant channel 44. The bore 48 is in a plane that extends perpendicular to the plane extending through the two trunnion axes 37, 38. A flexible hose 49 is inserted into the bore 48. The flexible hose 49 leads to the first lubricant guiding mechanism 50. The first lubricant guide mechanism is a through-bore in the first bearing journal 4. The other end of the hose 49 is inserted into the lubricant guiding mechanism 50. The first lubricant guiding mechanism 50 ends in the bearing bore 30.

Lubricant channels 51 are provided in the guiding disc 25. The lubricant channels 51 are in the form of radial bores that lead from the bearing bore 30 to the annular recess 24. Through-bores 53 are provided near an outer circumferential face 52 of the guiding disc 25. The outer circumferential face 52 is delimited by the guiding faces 32, 33. Through-bores 53 form a further part of the lubricant channel 51 and extend axis-parallel to the longitudinal axis 31. The through-bores 53 intersect a radial bore of the respective lubricant channel 51. Thus, each through-bore 53 leads from the first guiding face 32 to the second guiding face 33. This means that the guiding faces 32, 33 are directly lubricated with lubricant between the guiding faces 32, 33 and the respective surface of the guiding plates 26, 27. The through-bore 53 is arranged on a diameter around the longitudinal axis. The diameter ensures that the through-bores 53 are closed in each angular position of the two joints by the guiding plates 26, 27.

The second cross member 21 is identical to the first cross member 10 and include the same reference numbers. However, there is no connection between the second lubricant channel 44' and the bearing bore 30.

It is also possible for the guiding disc to be supported in an annular recess without being sandwiched between guiding plates. The lubricant, in such a case, is guided through the through-bores into the region between the sealing faces and the sliding faces of the annular recess.

While the above detailed description describes the preferred embodiment of the present invention, the invention is susceptible to modification, variation and alteration without deviating from the scope and fair meaning of the subjoined claims.

What is claimed is:

1. A centered double universal joint comprising:
    a first outer joint yoke with first outer yoke arms;
    a first bridge connecting the first outer yoke arms to one another;
    a first centering mechanism associated with the first bridge;
    a first inner joint yoke including first inner yoke arms;
    a first cross member articulatably connecting the first outer yoke arms via rolling contact bearings to the first inner yoke arms;
    a first lubricant channel for lubricating the rolling contact bearings provided in the first cross member;
    a second outer joint yoke with second outer yoke arms;
    a second bridge connecting the second outer yoke arms to one another;
    a second centering mechanism associated with the second bridge;
    a second inner joint yoke including second inner yoke arms;
    a second cross member articulatably connecting the second outer yoke arms via rolling contact bearings to the second inner yoke arms;
    a guiding disc defining a longitudinal axis, said guiding disc having a first central centering projection articulatably connected to the first centering mechanism of the first outer joint yoke, said guiding disc having a second central centering projection articulatably connected to the second centering mechanism of the second outer joint yoke, and guiding faces on the guiding disc being radially adjustably guided in an annular recess of a housing, the first inner joint yoke and the second inner joint yoke forming part of the housing;
    the first lubricating channel of the first cross member being connected to first lubricant guiding mechanism of the first centering mechanism; and
    the guiding disc having at least one lubricant channel which is connected to the first lubricant guiding mechanism of the first centering mechanism, said at least one lubricant channel extend to a circumferential surface of said guiding disc and ending in at least one of the guiding faces.

2. A centered double universal joint according to claim 1, wherein the lubricant channel of the guiding disc includes a first bore extending radially relative to the longitudinal axis and open to the annular guiding recess, as well as a second bore extending parallel to the longitudinal axis and ending in at least one of the guiding faces.

3. A centered double universal joint according to claim 1, wherein the first lubricant channel of the first cross member includes a bore opening towards the first bridge and connected to the first lubricant guiding mechanism of the first centering mechanism by a resilient hose.

4. A centered double universal joint according to claim 1, wherein a cylindrical bearing bore is provided in the guiding disc extending coaxially relative to the longitudinal axis through the first centering projection and the second centering projection, said first centering mechanism and the second centering mechanism each comprise a bearing journal extending coaxially relative to an axis of rotation of the respective outer joint yoke; and
    a bearing ball is provided per bearing journal in the form of a spherical layer with a spherical outer face, a through-bore in said bearing ball for positioning said bearing ball on the bearing journal and said bearing ball being held at least axially relative to the axis of rotation; and
    a bearing race is provided per bearing ball pivotably supporting the outer face of the bearing ball in a corresponding hollow-spherical bore in said bearing race and a cylindrical outer face on said bearing race for axially adjustably positioning said bearing race in the cylindrical bearing bore of the guiding disc.

5. A centered double universal joint according to claim 1, wherein annular guiding plates are arranged on both sides of the guiding disc in the annular recess, the annular recess being closed on its radial outside, the outer diameter of the guiding plates being greater than the inner diameter of the annular recess and smaller than the greatest diameter of the annular recess, the inner diameter of the guiding plate being greater than the outer diameter of the centering projections of the guiding disc and smaller than the outer diameter of the guiding disc, and the at least one lubricant channel of the guiding disc opens towards at least one guiding plate.

\* \* \* \* \*

UNITED STATES PATENT AND TRADEMARK OFFICE
CERTIFICATE OF CORRECTION

PATENT NO. : 6,863,615 B2
DATED : March 8, 2005
INVENTOR(S) : Herchenbach et al.

It is certified that error appears in the above-identified patent and that said Letters Patent is hereby corrected as shown below:

Column 6,
Line 20, After "mechanism", delete "said at least one lubricant channel extend to a circumferential surface of said guiding disc and ending in at least one of the guiding faces" and insert -- the lubricant channel of the guiding disc includes a first bore extending radially relative to the longitudinal axis and open to the annular guiding recess, as well as a second bore extending parallel to the longitudinal axis and ending in at least one of the guiding faces. --
Lines 25-30, delete "2. A centered double universal joint according to claim 1, wherein the lubricant channel of the guiding disc includes a first bore extending radially relative to the longitudinal axis and open to the annular guiding recess, as well as a second bore extending parallel to the longitudinal axis and ending in at least one of the guiding faces."

Signed and Sealed this

Twenty-sixth Day of July, 2005

JON W. DUDAS
*Director of the United States Patent and Trademark Office*